United States Patent [19]
Azumatani et al.

[11] Patent Number: 5,457,794
[45] Date of Patent: Oct. 10, 1995

[54] INFORMATION RETRIEVAL APPARATUS FOR SEARCHING TARGET LITERATURE DATA FROM AN INFORMATION RECORDING MEDIUM, INCLUDING REUSE OF PAST RETRIEVING RESULTS

[75] Inventors: Yasushi Azumatani; Isao Satoh, both of Neyagawa; Yoshihisa Fukushima, Osaka; Yuji Takagi, Hirakata; Hiroshi Hamasaka, Nishinomiya; Yuji Hisakado, Neyagawa, all of Japan

[73] Assignee: Matsushita Electric Industrial Co., Ltd., Osaka, Japan

[21] Appl. No.: 49,734

[22] Filed: Apr. 19, 1993

[30] Foreign Application Priority Data

Apr. 17, 1992 [JP] Japan .................................. 4-097611

[51] Int. Cl.$^6$ .................................................. G06F 17/30
[52] U.S. Cl. ............. 395/600; 364/419.19; 364/DIG. 1; 364/282.1
[58] Field of Search ....................... 364/419.19; 395/600, 395/425

[56] References Cited

U.S. PATENT DOCUMENTS

| 3,913,074 | 10/1975 | Homberg et al. | 395/375 |
| 5,222,234 | 6/1993 | Wang et al. | 395/600 |
| 5,265,242 | 11/1993 | Fujisawa et al. | 395/600 |

Primary Examiner—Paul V. Kulik
Attorney, Agent, or Firm—Ratner & Prestia

[57] ABSTRACT

The present invention relates to an information retrieval apparatus for retrieving large quantities of the document files stored in the information recording medium by the successive matched comparison between the character string of a target and the character string in the coded document. When the retrieving result of the document file retrieved in the past is stored within the information recording medium together with the retrieving conditions and the document file is retrieved again with the same retrieving conditions, the information retrieval apparatus of the present invention makes it unnecessary to retrieve the document file itself by the reuse of the past retrieving results if the latest retrieved date and time are newer than the recording date and time of the document file so as to shorten the retrieving time.

5 Claims, 15 Drawing Sheets

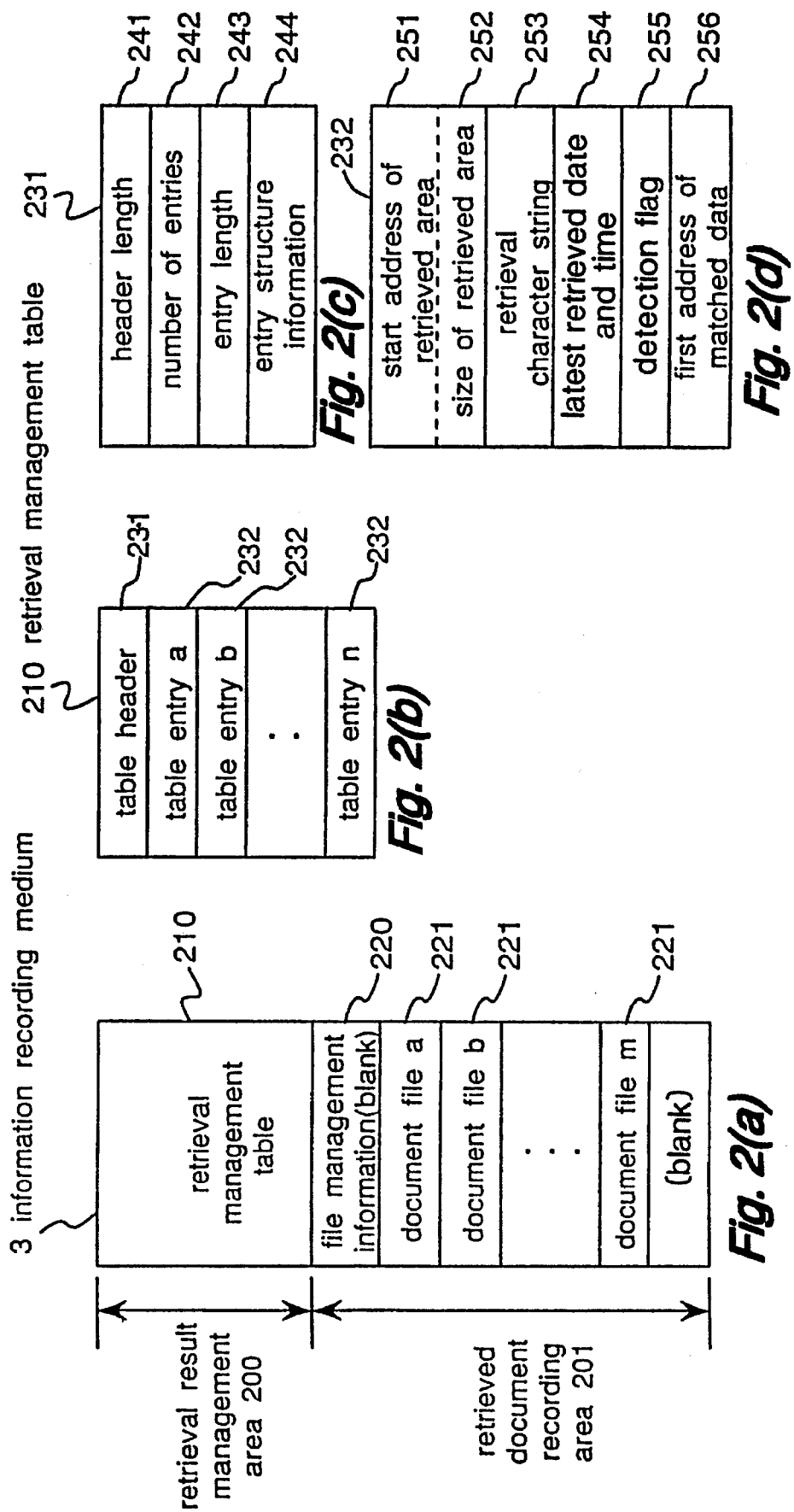

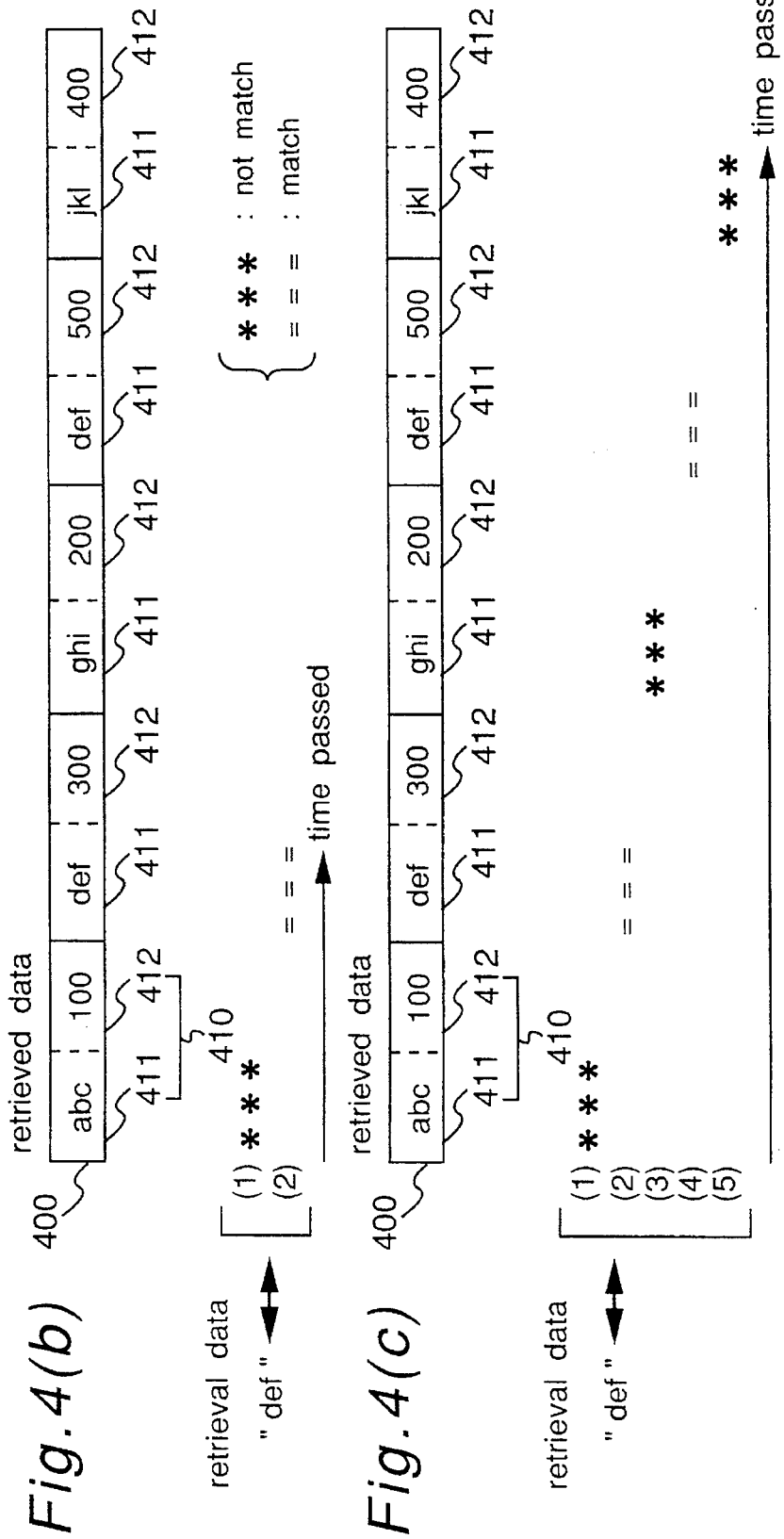

Fig.10(a)

| retrieved area (number) | 900 | 901 | 902 |
|---|---|---|---|
| start address of retrieved area (block) | 0 | 200 | 300 |
| size of retrieved area (byte) | 200 | 100 | 150 |
| retrieval character string | "ab" | "ab" | "ab" |
| latest retrieved date and time | T4 | T4 | T4 |
| detection flag | ON | OFF | ON |
| first address of matched data (byte) | 100 | — | 50 |

Fig.10(b)

| retrieved area (number) | 900 | 901 | 902 | 903 | 903 |
|---|---|---|---|---|---|
| start address of retrieved area (block) | 0 | 200 | 300 | 450 | 450 |
| size of retrieved area (byte) | 200 | 100 | 150 | 250 | 250 |
| retrieval character string | "ab" | "ab" | "ab" | "ab" | "cd" |
| latest retrieved date and time | T4 | T8 | T4 | T8 | T8 |
| detection flag | ON | ON | ON | ON | OFF |
| first address of matched data (byte) | 100 | 30 | 50 | 200 | — |

INFORMATION RETRIEVAL APPARATUS FOR SEARCHING TARGET LITERATURE DATA FROM AN INFORMATION RECORDING MEDIUM, INCLUDING REUSE OF PAST RETRIEVING RESULTS

BACKGROUND OF THE INVENTION

1. Field of the Invention

The present invention relates to an information retrieval apparatus for looking up target literature data from larger quantities of document data recorded on information recording medium without key words being given by successive matched, comparison among target character strings and the character strings in coded documents.

2. Description of the Prior Art

In recent years, larger quantities of coded documents have been used at offices and households because of popularization of word processors and personal computers. And for arrangement of the larger quantities of coded documents to effectively use them, mass data bases and high speed information retrieval apparatuses are researched, developed.

Many conventional information retrieval apparatuses give key words to be used as retrieving indexes at the recording time of the coded documents and search a target document by the retrieving operation of the key words at the document retrieving operation.

But an information retrieval apparatus which uses key words requires tremendous labor in assigning the key words, which also increases the amount of data associated with each document. Also, at the document retrieving operation, there is a problem in that the selection of proper key words whose retrieving leakage is not provided is very difficult to effect.

On the other hand, an information retrieval apparatus using a retrieving method of a coded document without the use of the key words called a full text searching system is also developed. This system searches for all the documents including retrieval character strings by the successive comparison between the retrieval character strings and the document data specified by a user. By the successive comparison between, for example, a retrieval character string "disk" and a character string within coded document, a document including "This optical disk offers high capacity." is retrieved.

FIG. 15 is a block diagram of the conventional information retrieval apparatus for using a full text searching system. In FIG. 15, 1 is a host computer for controlling an information retrieval apparatus 30 in accordance with the retrieving conditions specified by a user, 30 is an information retrieval apparatus for carrying out the recording, reproducing operations of the data on the information recording and medium 3 and also, retrieving the retrieval character strings from among the reproducing data, 31 is a microcontroller for controlling the whole information retrieval apparatus 30 with a firmware accommodated therein, 5 is a host interface circuit for controlling the transferring operation of device command, recording data, reproducing data, command status and so on with respect to the host computer 1 through a host interface 100 like SCSI (Small Computer System Interface), 32 is a string retrieval circuit for detecting the retrieval character string set by the microcomputer 31, the construction is disclosed in, for example, Japanese Patent Laid-Open No. 3-268063. 10 is a recording and reproducing circuit for adding error correcting codes to the recording data, modulating, reproducing recording signal 101 and also, demodulating the reproducing signal 102 to be read from the information recording medium 3, carrying out the error correction processing operation, 11 is a drive unit for recording, reproducing signals with respect to the information recording medium 3 engaged therein, 33 is a memory circuit for connecting a microcontroller 31, a host interface circuit 5, a string retrieval circuit 32 and the recording and reproducing circuit 10 through the data bus 13, and temporarily preserving the data to be used by the information retrieval apparatus 30. In it, there is included a transfer data memory 14 for retaining the recording data and the reproducing data to be transferred between the host computer 1, and a retrieval data memory 15 for retaining the retrieved data.

The operation of the conventional information retrieval apparatus constructed in this manner will be described hereinafter. What many document files managed with an existing file system such as, for example, MS-DOS and UNIX are already recorded in the information recording medium will be described.

The host computer 1 reads from the information recording medium 3 a directory file which manages the document files, when a user specifies the retrieved document, so to find out the recording position and the file size of the document file within the information recording medium 3 from the file management information. Then, the host computer 1 transmits to a host interface circuit 5 a device command called SEARCH command for setting the recording position and the size of the document file recorded as a file management information and retrieving characters strings specified by the users.

When the microcontroller 31 receives a device command 103 from a host interface circuit 5, the recording, reproducing control signal 104 including the recording position and size of the document file is transmitted so as to start the reproducing operation of the retrieved data by the recording and reproducing circuit 10. The recording and reproducing circuit 10 reproduces a signal from the specified area of the information recording medium 3 so as to execute the demodulating processing and the error correcting processing operation and thereafter, stores within the retrieval data memory 15 the reproducing data through the data bus 13.

The microcontroller 31 transmits the retrieving control signal 106 including the retrieval character strings when the completion of the data reproducing operation is detected from the condition of the recording, reproducing busy signal 105 so as to start the retrieving operation by the string retrieval circuit 32. At this time, the string retrieval circuit 32 reads the reproducing data from the retrieval data memory 15 so as to execute the matched comparison with respect to the specified retrieval character strings. And the string retrieval circuit 32 completes the retrieving operation with respect to the whole reproducing data and transmits to the microcontroller 31 a retrieving status 107 showing whether or not the match with respect to the retrieval character string is detected.

When the microcontroller 31 detects the completion of the retrieving operation, the command status 108 corresponding to the condition of the retrieving status 107 is set in a host interface circuit 5 so as to complete the command execution by the transfer to the host computer 1.

By retrieving operation of such document file as described hereinabove, the information retrieval apparatus 30 can discriminate whether or not the retrieval character string is included in the document file specified by the user. Therefore, the user can look up a document file including the retrieval character string without use of the key words from the many document files recorded on the information recording medium 3.

But the retrieving time of the document file using this method is simply proportioned to the number and file size of the document files which become the retrieving object. Thus, there is a problem in that the retrieving time is not contracted if the document file is retrieved with the use of the same retrieving conditions in the past.

SUMMARY OF THE INVENTION

An object of the present invention is to provide an information retrieval apparatus, where the retrieving results of the document files retrieved in the past are stored within the information recording medium together with the retrieving conditions, and the retrieving operation of the document file itself is made unnecessary with the reuse of the past retrieving results, when the document file is retrieved again with the same retrieving conditions, so as to shorten the retrieving time.

In order to achieve the above described object, the present invention provides an information retrieval apparatus, connected with a host computer, for using an information recording medium with many document files being recorded on it with the use of a file system where file recording date and time and file recording area are recorded as file management information, comprising a retrieval data memory for temporarily preserving the retrieved data read out from the information recording medium, a string detection circuit for detecting the presence, absence of the retrieval character string by the matched comparison between the data within the retrieval data memory and the specific retrieving character spring, a retrieval management table producing means for producing a retrieval management table composed of a plurality of table entries including document file recording area, retrieval character string, latest retrieved date and time, and retrieving results, a retrieval management memory for temporarily preserving the retrieval management table, a recording and reproducing circuit for recording the contents-of the retrieval management memory on the information recording medium and also, reproducing the data from the information recording medium so as to store on the retrieval data memory and the retrieval management memory, a table detection circuit for retrieving a table entry with the recording area of the specified document file and the retrieval character string with respect to a retrieval management table stored in the retrieval management memory, and a retrieval controlling means where, when a table entry with the recording area of the specified document file and the retrieval character string has been detected by the table detection circuit,the final retrieved data and management recorded on the table entry are compared with the recorded date and management of the document file, the retrieving results stored on the retrieval management table are used, if the recording date and time are older than the latest retrieved date and time, when the latest retrieved date and time are older than the recording date and time or when a table entry with the recording area of the specified document file and the retrieval character string has not been detected by the table detection circuit, the document file is read out from the information recording medium, thereafter the retrieving operation of the document file is executed with the use of the string detection circuit, further the contents of the retrieval management table is updated in accordance with the retrieving results so as to record the information recording medium.

The information retrieval apparatus of the present invention as constructed hereinabove detects whether or not the document file has been retrieved with the use of the same retrieving conditions in the past by the comparison between the final retrieved date and time recorded on the retrieval management table of the document file and the recording date and time of the document file. And when it has been found out that the retrieving operation has been effected in the past, the retrieving operation of the document file becomes unnecessary by the re-use of the retrieving results recorded on the retrieval management table so that the retrieving time can be considerably shortened.

Also, the present invention relates to an information retrieval apparatus, which is connected with a host computer, for using an information recording medium with many document files recorded on it with the use of a file system where the file recording area is recorded as file management information, comprising a recording and reproducing circuit for executing the recording, reproducing operations of the data with respect to the information recording medium, a retrieval data memory for temporarily preserving the retrieved data read out from the information recording medium, a string search circuit for transmitting all the position informations of the retrieval character strings detected by the matched comparison between the data within the retrieval data memory and the specific retrieval character string, a matched data memory of temporarily preserving all the position informations of the retrieval character strings to be transmitted by the character sting detail retrieving circuit, a position information retrieving means for transferring to the host computer all the positional informations of all the retrieval character strings stored in the matched data memory, after the retrieving operation of the data within the retrieval data memory with the use of the string search circuit.

The information retrieval apparatus of the present invention as described hereinabove is capable of proposing with high speed and with efficiency to the user the positions of the retrieval character strings to be included in the document files by the transferring operation to the host computer by the retrieving operation of, with high speed, all the positional informations of the retrieval character strings to be included in the document file.

BRIEF DESCRIPTION O THE DRAWINGS

FIG. 1 is a block diagram of an information retrieval apparatus in one embodiment of the present invention;

FIGS. 2(a)–2(d) are data block diagrams

FIG. 4(a) is a view showing a data structure of the retrieved data to be applied to a table detection circuit and table search circuit;

FIG. 4(b) is an explanatory view for explaining an operation of a table detection circuit;

FIG. 4(c) is an explanatory view for explaining an operation of a table search circuit;

FIG. 10(a) is a diagram showing contents of retrieval management table after the FIND STRING command is executed at the time of T4;

FIG. 10(b) is a diagram showing contents of retrieval management table after the FIND STRING command is executed at the time of T8;

DESCRIPTION OF THE PREFERRED EMBODIMENT

Figure 1:
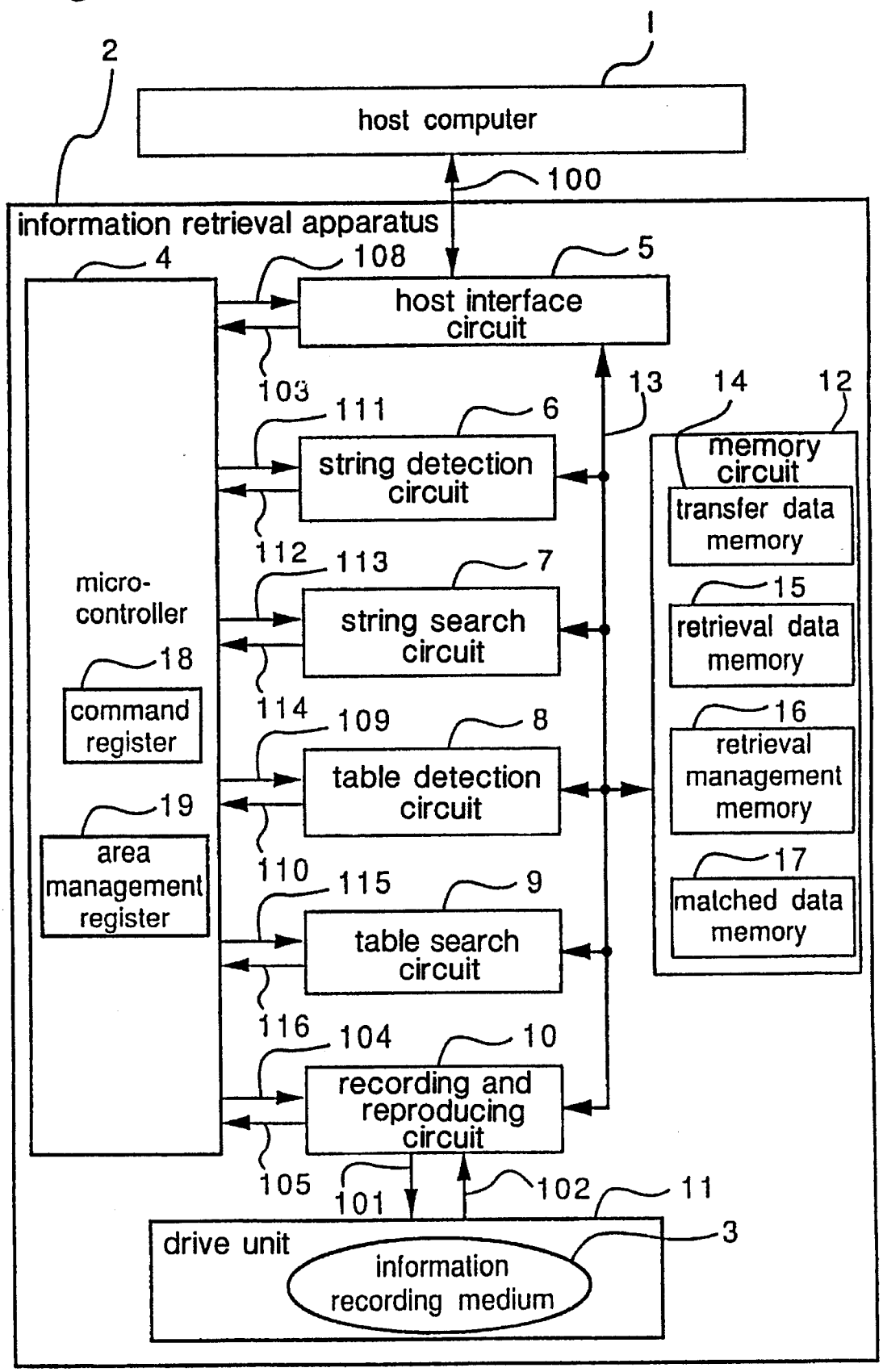

One embodiment of the present invention will be described hereinafter with reference to the drawings. Assume that the information recording medium 3 has many already recorded document files managed with the use of the existing file system like, for example, MS-DOS and UNIX.

FIGS. 2(a)–2(d) are data block diagrams of an information recording medium 3 to be used by the information retrieval apparatus in one embodiment of the present invention.

FIG. 2(a) is a area block diagram of an information recording medium 3 with a retrieving result management area 200 on which the retrieval management table 210 for the managing operation of the past retrieving results being recorded, and the retrieved document recording area 201 on which many document files 221 are recorded together with the file management information 220 being assigned to the information recording medium 3. A file management information 220 to be recorded within the retrieved document recording area 201 is information for the managing operation of the recording area and recording date and time of all the document files 221 recorded on the retrieved document recording area 201. Concretely, when MS-DOS is used as the file system, the directory file and a FAT (File Allocation Table) are included in the file management information.

FIG. 2(b) is a data block diagram of a retrieval management table 210, and is composed of one table header 231 and table entries 232 of 0 number or more. Also, FIG. 2 (c) is a data block diagram of a table header 231, and is composed of a header length 241, a number of entries 242, an entry length 243, and an entry structure information 244 with the data length of the respective fields constructing the table entry 232 being described on it. FIG. 2 (d) is a data block diagram of a table entry 232, and is composed of the respective fields of a start address 251 of retrieved area and the size 252 of the retrieved area to be recorded for the managing operation of the position of the retrieved area, a retrieval character string 253 to be used, a latest retrieved date and time 254 which are the date and time retrieved finally, a detection flag 255 showing whether or not the retrieval character string 253 has been detected from the retrieved area, and a first address of matched data 256 showing the address of the retrieval character string 253 detected first within the retrieved area.

Figure 15:
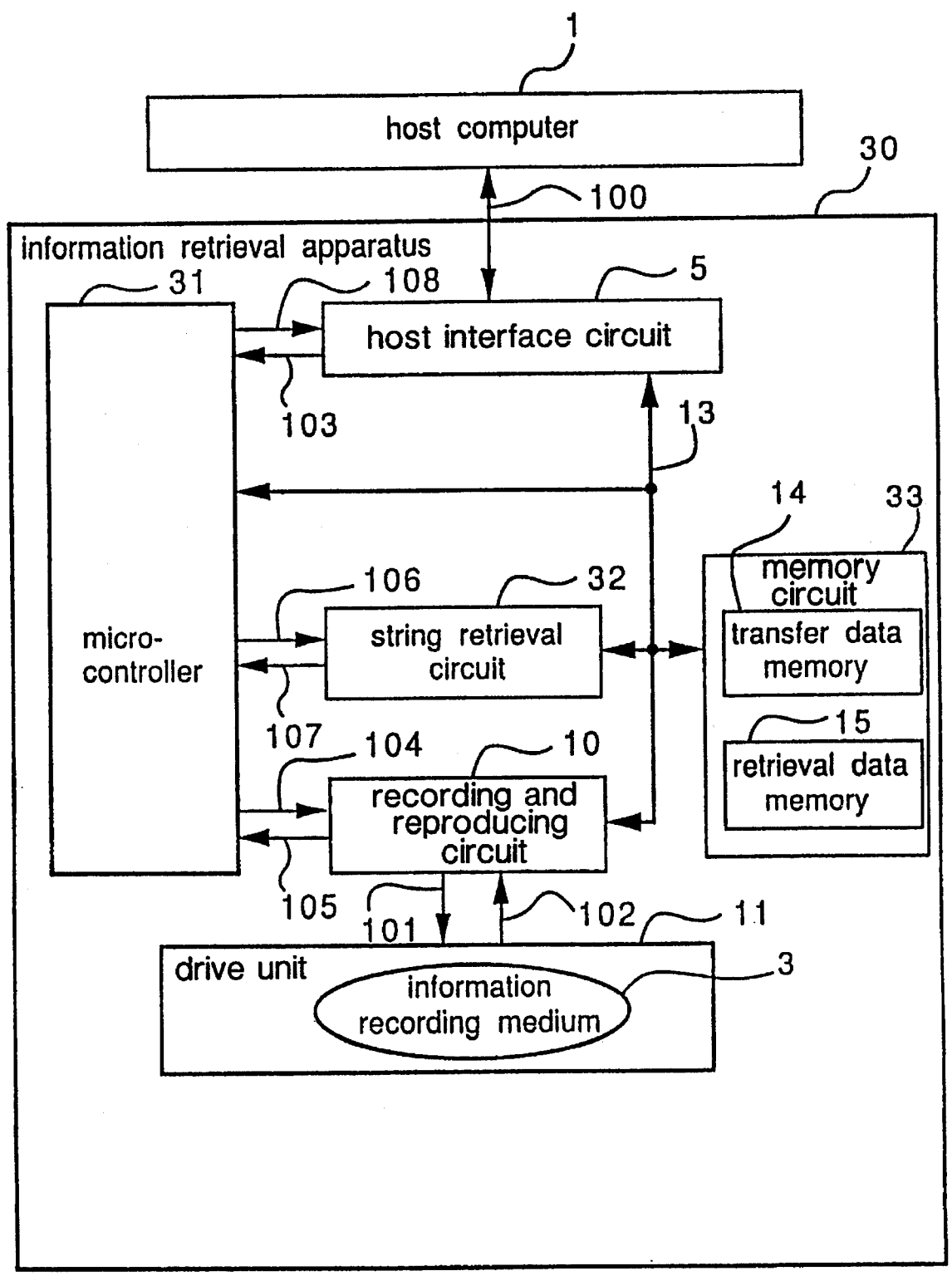
FIG. 15 is a block diagram of the conventional information retrieval apparatus.

FIG. 1 is a block diagram of an information retrieval apparatus in one embodiment of the present invention. In FIG. 1, the components the same as FIG. 15 in the block diagram in the conventional embodiment will be omitted in description, with the same numerals being given to them.

In FIG. 1, 2 is an information retrieval apparatus for carrying out the retrieving operation of the document file recorded on the information recording medium 3, 4 is a microcontroller for controlling the whole information retrieval apparatus 2 by the firmware accommodated therein, 6 is a string detection circuit for detecting the presence, absence of the retrieval character string by the matched comparison between the data within the retrieval data memory 15 and the specific retrieval character string, 7 is a string search circuit for transmitting all the positional informations of the retrieval character strings detected by the matched comparison between the data within the retrieval data memory 15 and the specific retrieval character string, 8 is a table detection circuit for detecting the presence, absence of the table entry having the recording area of the document file and the retrieval character string with respect to the retrieval management table stored in the retrieval management memory 16, 9 is a table search circuit for retrieving all the table entries having the recording area of the document file and retrieval character string with respect to the retrieval management table stored on the retrieval management memory 16, 12 is a memory circuit for temporarily preserving the various data the information retrieval apparatus 3 uses. The memory circuit 12 includes a transfer data memory 14 to be used for the data transfer with respect to the host computer, a retrieval data memory 15 where the retrieved data to be read out from the information recording medium 3 is stored, a retrieval management memory 16 where the retrieval management table 210 to be read out from the retrieval result management area 200 is stored, a matched data memory 17 for preserving the address information detected in the retrieving operation. Also, 18 is a command register within a microcontroller 4 for accommodating the device command from the host computer 1, 19 is a area management register within the microcontroller 4 for accommodating the positional information on the information recording medium 3 about the retrieved data stored on the retrieval data memory 15.

Figure 3A:
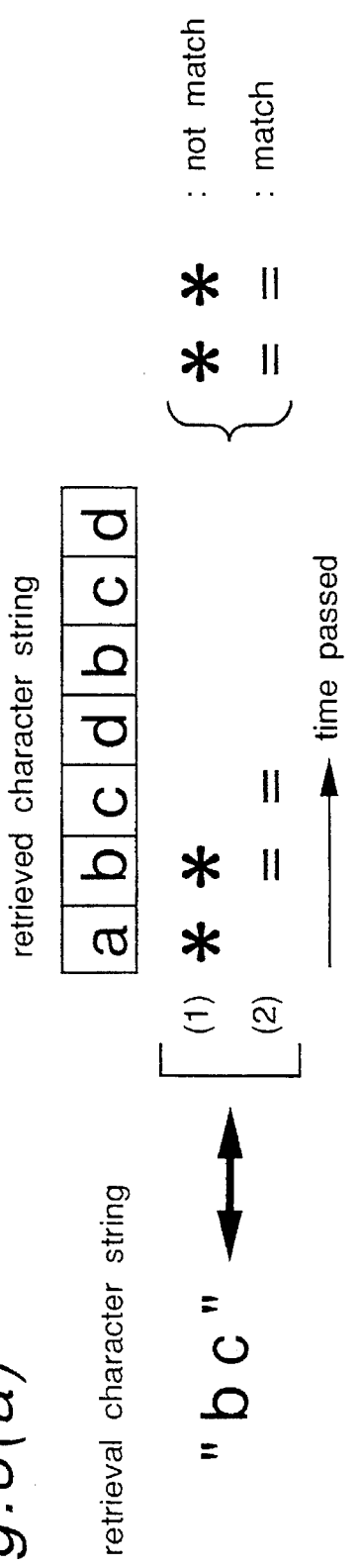
FIG. 3(a) is an explanatory view for explaining an operation of a string detection circuit.
Figure 3B:
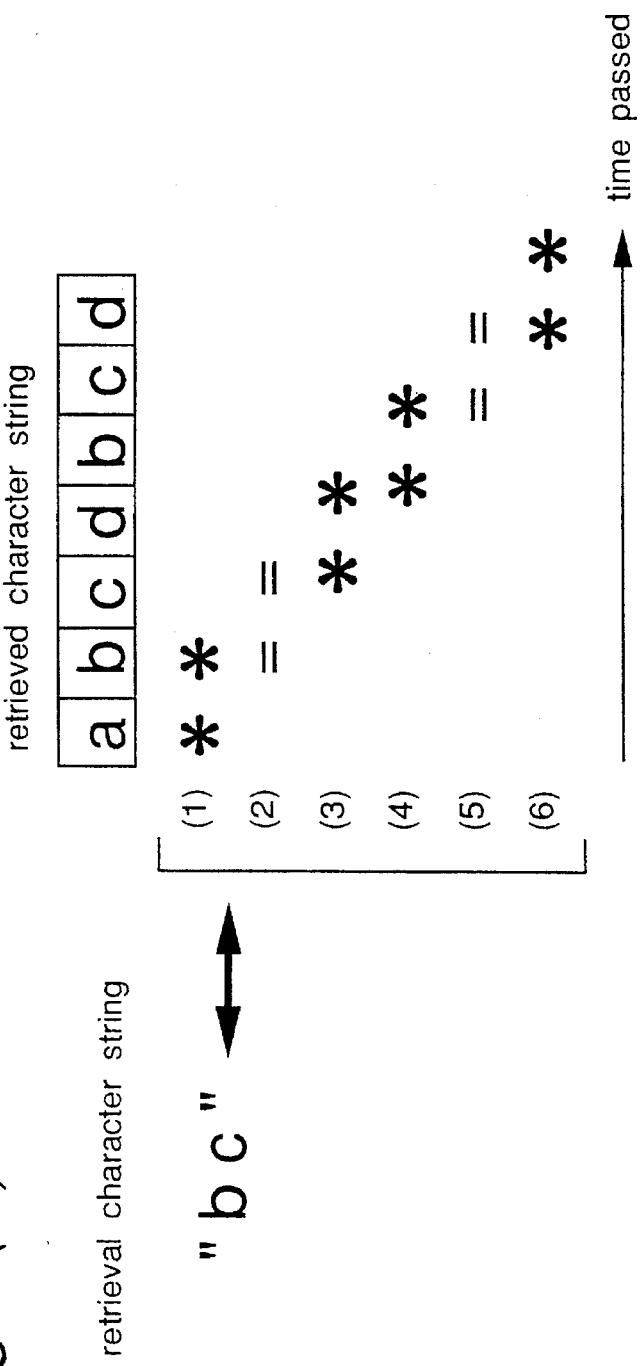
FIG. 3(b) is an explanatory view for explaining an operation of a string search circuit.

Then, the string detection operation the string detection circuit 6 shown in the block diagram of FIG. 1 executes, and the string search operation the string search circuit 7 executes will be described with the use of the data examples of the retrieved character string and the retrieval character string shown in FIGS. 3(a)–3(b).

FIG. 3 (a) is an explaining view of an operation to be compared between a retrieval character string "bc" and the retrieved character string "abcdbcd" by the string detection circuit 6. The string detection circuit 6 effects the matched comparing operation with the retrieval character string in order from the head of the retrieved character string. Namely, the retrieval character string "bc" is compared first with the character string "ab", and then, is compared with the character string "bc" whose one character is shifted. When the match of the character string is detected during the continuous executing operation of such successive comparing operation, the matched address is transmitted so as to complete the comparison operation.

Also, FIG. 3 (b) is an explaining view of a comparing operation between the retrieval character string "bc" and the retrieved character string "abcdbcd" by the string search circuit 7. The string search circuit 7 effects matched comparing operation with respect to the retrieval character string in order from the head of the retrieved character string as in the string detection circuit 6. Namely, the retrieval character string "bc" is first compared with the character string "ab", and then, is compared with one character shifted character string "bc". When the match of the character string is detected during the successive executing operation of such successive comparing operation, the matched address is transmitted. The string search circuit 7 effects the matched comparison with respect to the successive retrieved character string even after the match of the character string has been detected so as to effect the comparing operation till the end of the retrieved character string. Accordingly, the string search circuit 7 can detect the addresses of all the retrieving characters strings existing within the retrieved character string.

Also, the table detection operation the table detection circuit 8 shown in the block diagram of FIG. 1 executes and the table search operation the table search circuit 9 executes will be described with the use of the examples of the retrieved data and the retrieved data shown in FIGS. 4(a)–4(c).

FIG. 4 (a) is a data block diagram of the retrieved data. Many table entries 410 are included in the retrieved data 400, and also, the respective table entry 410 is composed of a retrieved field 411 of fixed length to be compared with the retrieved data, and an output field 412 of fixed length to be read out as retrieving results when the match has been detected.

FIG. 4 (b) is an explaining view of a retrieving operation of the retrieved data 400 by the table detection circuit 8 with the characters string "def" as retrieved data. The microcontroller 4 sets the length of the table entry, the retrieved field and the output field, the number of table entries in the table detection circuit 8 prior to the retrieving operation. Then, the table detection circuit 8 effects an matched comparing operation, with the retrieved data, of only the retrieved field of the table entry in order from the head of the retrieved data 400. Namely, the retrieval data "def" is compared first with the retrieved field "abc", and then, is compared with a second retrieved field "def". When the match with the retrieved data is detected during the continuous execution of such comparing operation, the address of the table entry detected in match and the value "300" of the output field are transmitted so as to complete the comparing operation.

Also, FIG. 4 (c) is an explaining view of the retrieving operation of the retrieved data 400 by the table search circuit 9 with the character string "def" as the retrieved data. The table search circuit 9 effects a matched comparing operation with a retrieved data only with the retrieving filed of the table entry in order from the head of the retrieved data 400 as in the table detection circuit 8. Namely, the retrieved data "def" is first compared with the 10 retrieved field "abc", and then, is compared with the second retrieved field "def". When the match with the retrieved data is detected during the continuous execution of such comparing operation, the address of the table entry detected in match and the value "300" of the output field are transmitted. The table search circuit 9 effects a matched comparing operation with respect to the successive table entry even after the match has been detected, the comparing operation is executed till the last table entry. Accordingly, the table search circuit 9 effects the matched comparing operation of all the table entries to be included in the retrieved data 400, and the addresses of all the table entries detected in match and the values of the output fields can be outputted.

The operation will be described hereinafter about the information retrieval apparatus in one embodiment of the present invention constructed as described hereinabove. Generally, in the retrieving operation of the document file, the squeezing processing operation for the detection of the total number of the document files including the retrieval character string specified by the user, and the content confirmation processing operation for proposing to the user the presence position of the retrieval character string to be included in the restricted squeezed document file are executed.

Figure 5:
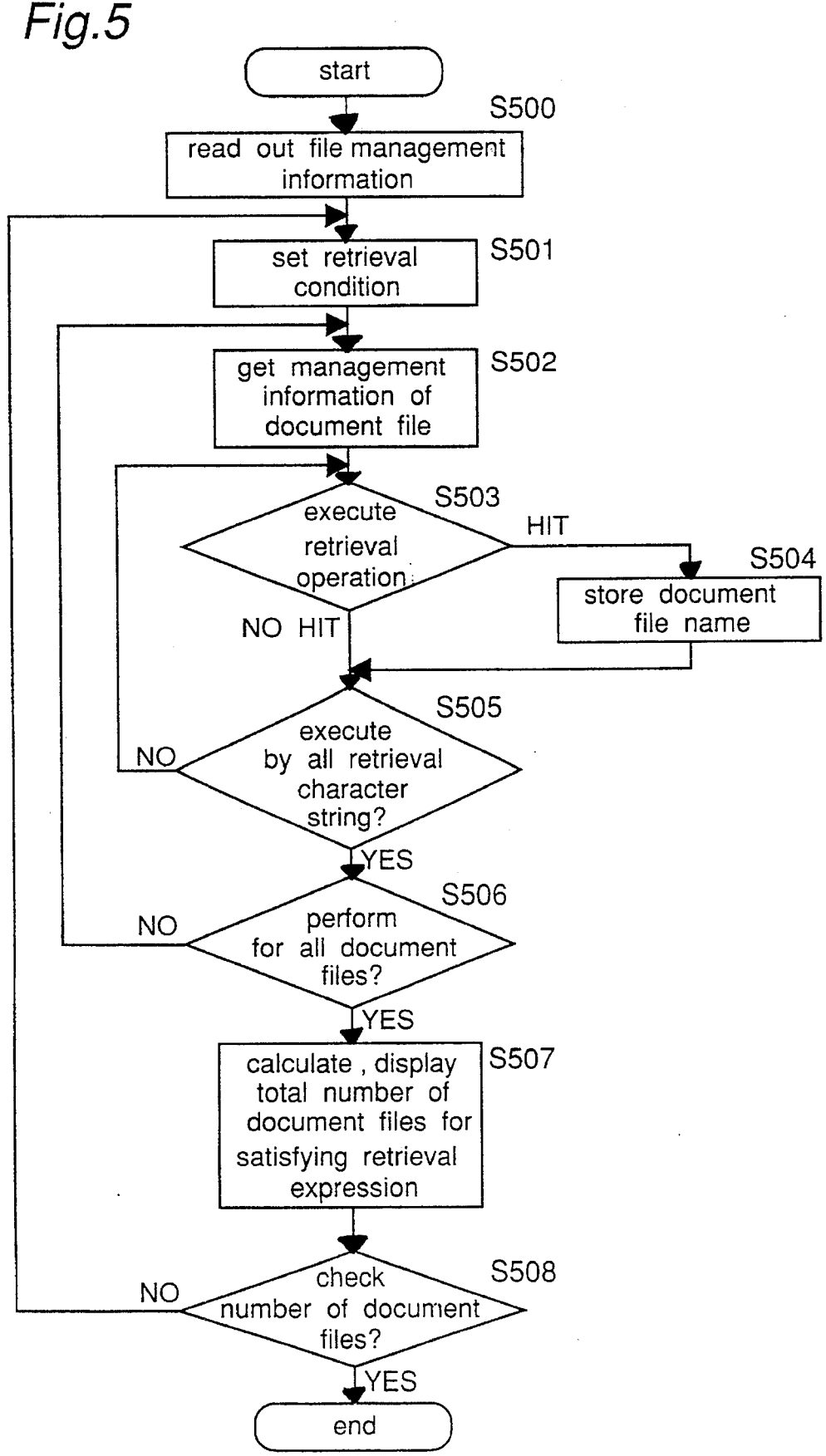
FIG. 5 is a flow chart for describing an operation of squeezing the number of the document files by the host computer.

FIG. 5 is a flow chart for explaining the processing step about the above described squeezing processing. (Step 500) When the information recording medium 3 has been engaged, the host computer 1 executes the device command like a READ command so as to read out the file management information 220 from within the retrieved document recording area 201 of the information recording medium 3 and store it in the internal memory (not shown). (Step 501) The user specifies a retrieval expression using the retrieval character string and the range of the document file to be retrieved. (Step 502) The host computer 1 finds out the recording area and the recording date and time of the specified document file 221 from the file management information 220. (Step 503) The host computer 1 issues the recording area and the recording date and time of the document file 221, the present date and time to be obtained from the internal timer, and a FIND STRING command where the retrieval character string specified by the user is set as a parameter. The FIND STRING command is a device command for retrieving the document file 221 with the use of the specified retrieval character string, and the command specification and the detailed operating description will be described later. (Step 504) When the retrieval character string detected from the document file 221 at the Step 503, the host computer stores in the internal memory (not shown) the document file. (Step 505) The host computer 1 repetitively executes the processing step (Step 503) and its subsequent operations till the retrieving operation about all the retrieval character strings specified by the user is completed at the Step 501. (Step 506) The host computer 1 repetitively executes the processing step (Step 502) and its subsequent operations till the retrieving operation about all the document files specified by the user at the Step 501 is completed. (Step 507) The host computer 1 calculates the number of the document files for satisfying the retrieval expression with the use of the document file names stored in the processing step (Step 504). And the number of the document files for satisfying the retrieval expression is displayed to inform the user of it. (Step 508) The user judges whether or not the number of the document files the host computer 1 displays is proper. And when the number of the document files for satisfying the retrieving expression is excessively more or less, the user returns to the processing step (Step 501) so as to specify the retrieval expression using the new retrieval character strings and the range of the retrieving document files.

Figure 6:
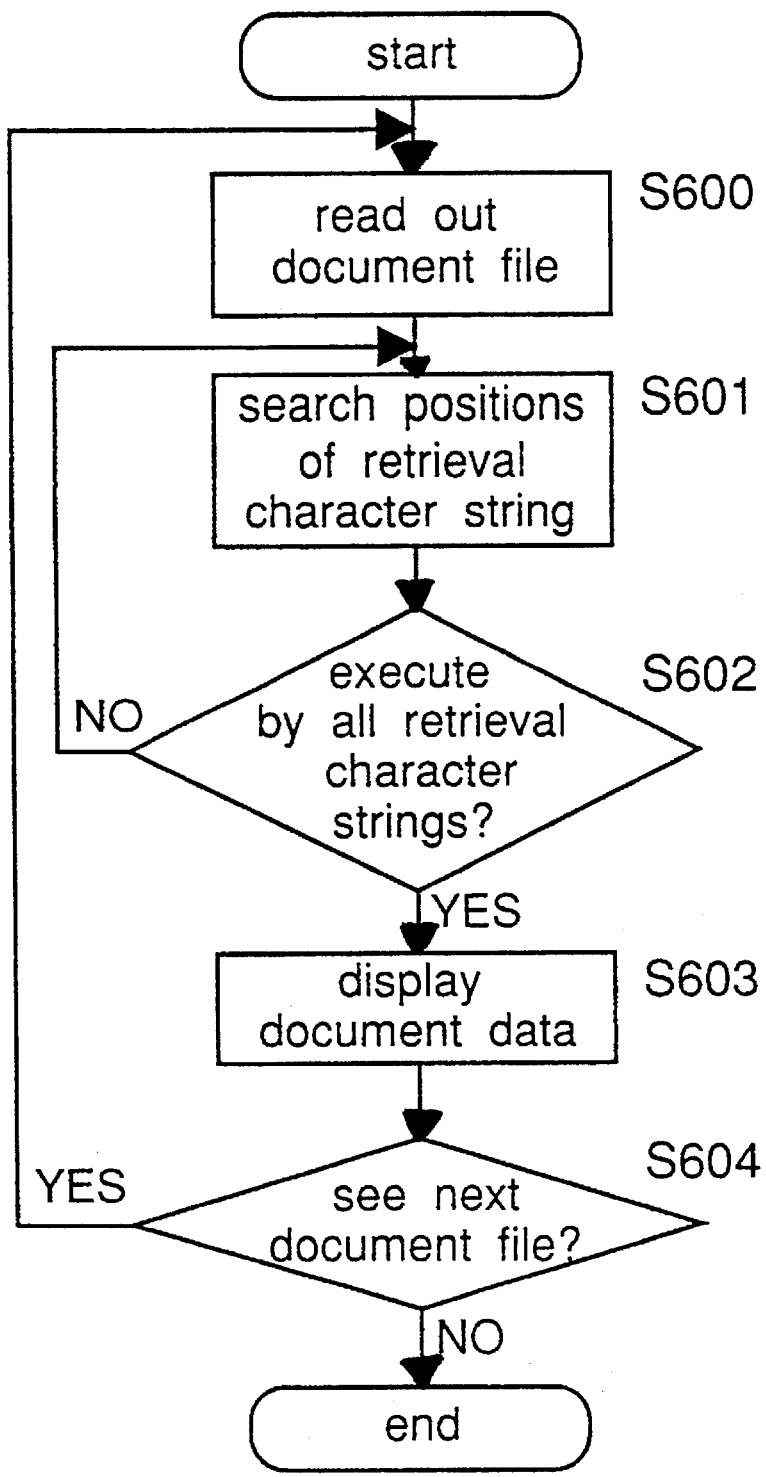
FIG. 6 is a flow chart for describing the operation for proposing to the user the position of the retrieval character string to be included in the document file by the host computer.

Then, the content confirming processing operation for proposing to the user the existence position of the retrieval character strings to be included in the restricted document files will be described in accordance with the flow chart of FIG. 6. (Step 600) The host computer 1 issues, for example, a READ command, after finding from the file management information 220 the recording area of the document file 221 satisfying the retrieving conditions so as to read out from the information recording medium 3 the document file 221. (Step 601) The host computer 1 issues the GET POINTERS command with the recording area of the document file 221 and the retrieval character string being set as parameters. The GET POINTERS command is a device command for retrieving all the positional informations of the retrieval character string to be included in the document file 221, and the command specification and the detailed operation description will be given later. (Step 602) The host computer 1 repetitively executes the processing step (Step 601) and its subsequent operations till the positional informations within the document file 221 about all the retrieval character strings specified by the user is gotten. (Step 603) The host computer 1 notifies the positions the retrieval character strings to the user by the displaying of the color change for each of the retrieval character strings with the use of the positional informations of the retrieval character strings detected previously when the document data within the document file 221 is displayed. (Step 604) When the user refers to the document data of the next document file 221 satisfying the retrieving conditions, the processing step (Step 600) and its subsequent operations will be executed about the new document file.

Three types of device command specification and the detailed operation to be executed about the retrieving operation by the information retrieval apparatus 2 will be described hereinafter in order.

Figure 7A:
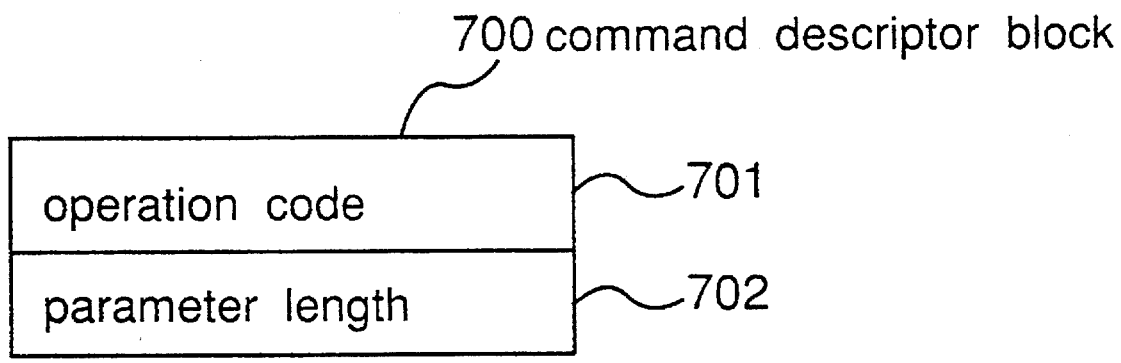
FIG. 7(a) is a diagram showing a structure of a command descriptor block of FIND STRING command.
Figure 7B:
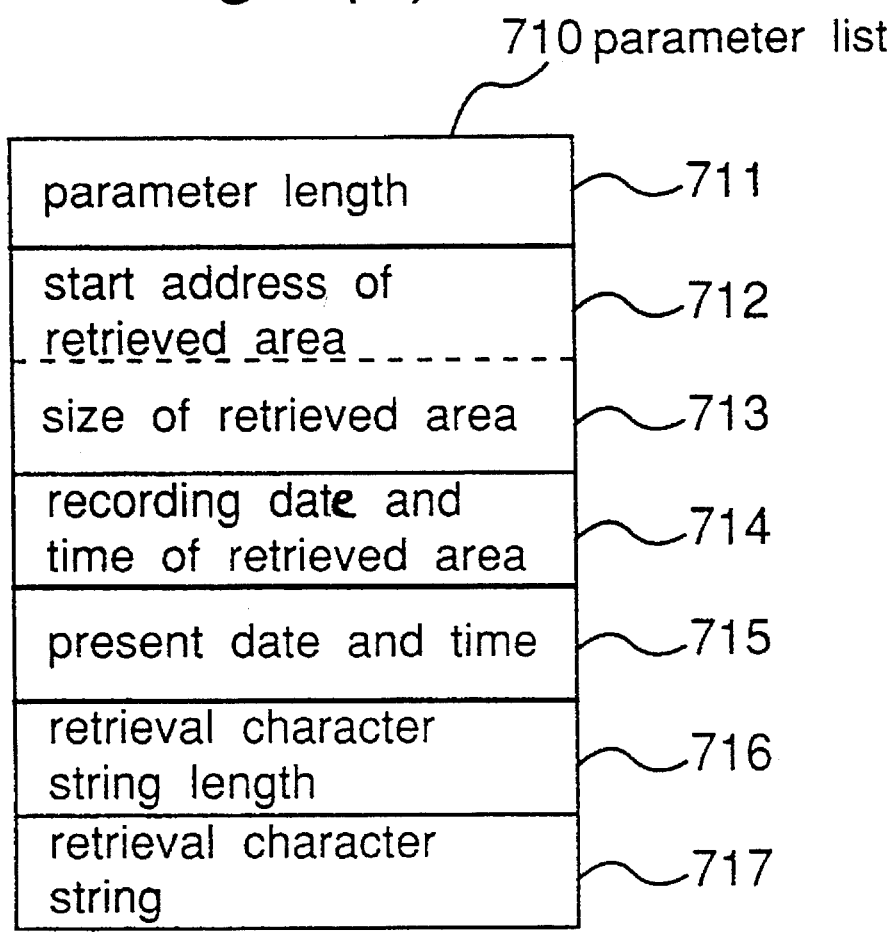
FIG. 7(b) is a diagram showing a structure of a parameter list of FIND STRING command.

FIGS. 7(a)–7(b) are is a block diagram of a FIND STRING command investigating whether or not the retrieval character string exists in the retrieved area on the information recording medium 3 specified by the host computer 1. FIG. 7 (a) is a block diagram of the command descriptor block of the FIND STRING command, FIG. 7 (b) is a block diagram of the parameter list to be transferred with the command descriptor block from the host computer.

The command descriptor block 700 is composed of an operation code 701 showing the FIND STRING command, and a parameter length 702 which is the length of the parameter list. Also, the parameter list 710 is composed of a parameter length 711, a start address 712 of a retrieved area, a size 713 of the retrieved area, a recording date and time 714 of the retrieved area, a present date and time 715, a retrieval character string length 716, and a retrieval character string 717. It is noted that the recording date and time 714 of the retrieved area is set from the file recording date and management to be included in the file management information, and the present date and time is set from the real time clock with, for example, the host computer 1 being built in.

Figure 8:
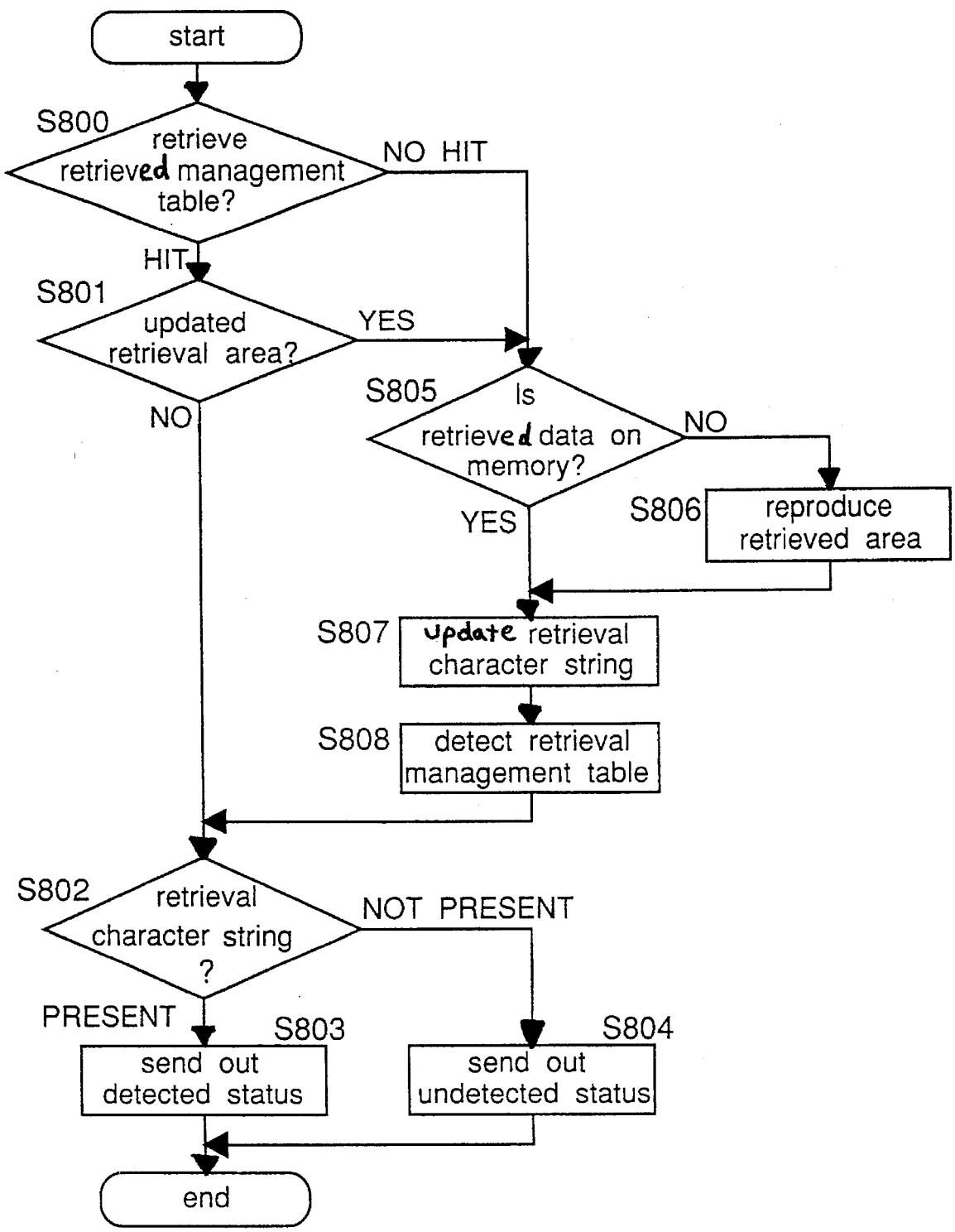
FIG. 8 is a flow chart for describing the operation of the FIND STRING command.

FIG. 8 is a processing step of the FIND STRING command to be executed by the information retrieval apparatus 2. In order to concretely describe the processing step, the time lapse on the registration •renewal •deletion of the document file in the retrieved document recording area 201 and the condition change in the retrieval management table 210 related to the time lapse will be described hereinafter.

Figure 9:
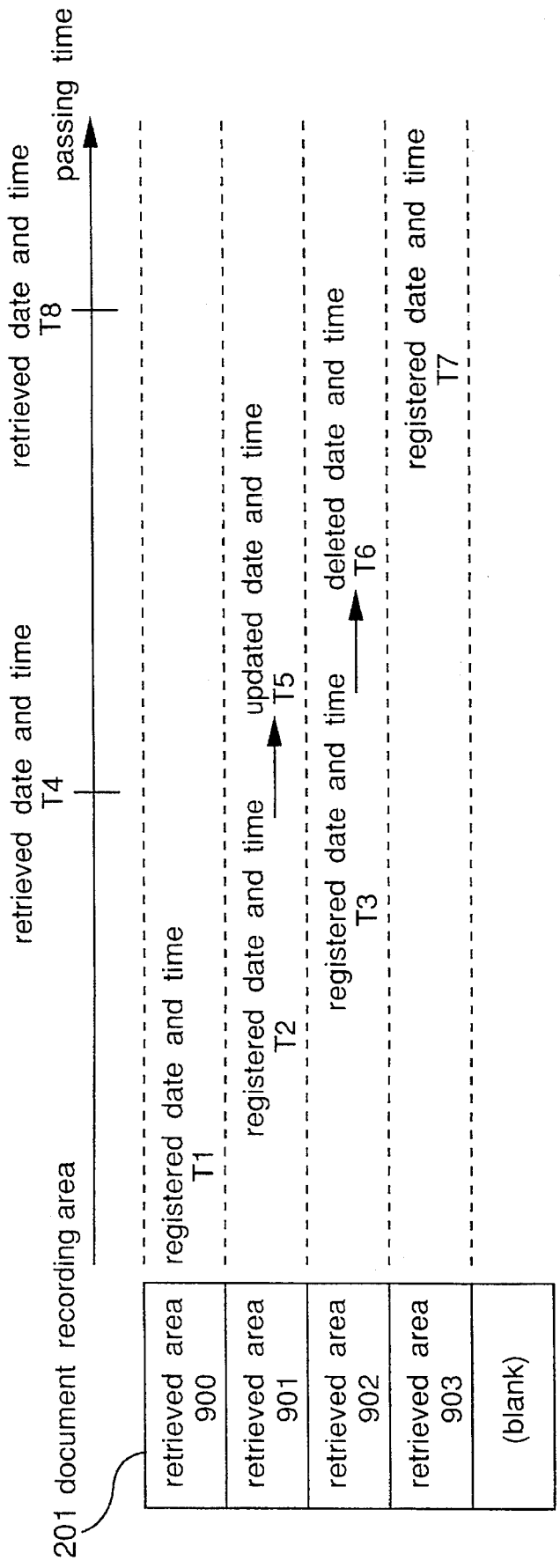
FIG. 9 is a condition variation view of a retrieved area within the retrieved document recording area.

FIG. 9 is a condition variation chart of the retrieved areas within the retrieved document recording area 201. In FIG. 9, the time lapse on the registration •renewal •deletion of the respective document files to be recorded on the retrieved document recording area 201 will be described as the relative relation with respect to the execution date and time of the FIND STRING command. Namely, a certain document file is registered in the retrieved area 900 in the date and time T1, another document file is registered in the retrieved area 901 at the date and time T2, still another document file is registered in the retrieved area 902 at the date and time T3. The FIND STRING command is executed at the date and time T4 in this condition. Further, the data of the retrieved area 901 is updated at the date and time T5, the data of the retrieved area 902 is deleted at the date and time T6, the new document file is registered in the retrieved area 903 at the date and time T7. And the FIND STRING command is executed again at the date and time T8 after such a condition change. FIG. 9 explains from the relation with respect to the execution time of the FIND STING command the condition change of the respective document files in such retrieved document recording area 201 as describe hereinabove.

FIGS. 10(a)–10(b) are a condition variation chart of a retrieval management table 210 accompanied by the execution of the FIND STRING command. FIG. 10 (a) is the contents of the retrieval management table 210 after the FIND STRING command has been executed at the date and time T4 in FIG. 9, FIG. 10 (b) is the contents of the retrieval management table 210 after the FIND STRING command has been executed at the date and time T8 in FIG. 9.

Then, the operation of the FIND STRING command will be described hereinafter in accordance with the flow chart of FIG. 8 with reference to the concrete embodiments described in FIG. 9 and FIGS. 10(a)–(b). (Step 800) The microcontroller 4 receives the device command 103 from the host interface circuit 5 and accommodates in the command register 18 the parameter list 710. The microcontroller sets in the table detection circuit 8 with the parameter composed of the start address 712 of the retrieved area to be included in the parameter list 710, the size 713 of the retrieved area, the retrieval character string 715 being considered one retrieval character string. At the same time, the microcontroller 4 sets the number of the entries 242, the entry length 243, the length of the retrieved field 411, the length of the output field 412 respectively in the table detection circuit 8 as the retrieving parameter described in FIG. 4. At this time, the retrieved field length is set so that the start address 712 of the retrieved area, the size 713 of the retrieved area and the retrieval character string 715 may come into an matched retrieving operation, and the output field length is set so that the latest retrieved date and time 254, the detection flag 255 and the first address of matched data 256 may be outputted. After the various types of control parameters have been set, the microcontroller 4 transmits the table detection control signal 109 so as to start the table detection circuit 8. Then, the table detection circuit 8 reads out the retrieval management table 210 from the retrieval management memory 16 so as to execute the table detection operation. When the information recording medium 3 has been engaged with the drive unit 11, the retrieval management table 210 is accommodated in the retrieval management memory 16 by the reading out operation from the retrieval result management area 200. When the retrieving operation has been completed, the table detection circuit 8 transmits the table detection status 110 showing whether or not the table entry 232 has been detected. (Step 801) When the microcontroller 4 receives the table detection status 110 showing the detecting operation of the table entry 232, the latest retrieved date and time 254 within the table entry 232 detected, the retrieving flag 255 and the first address of matched data 256 within the table entry 232 detected are obtained through the data bus 13 from the table detection circuit 8. And the microcontroller 4 compares the recording date and time 714 of the retrieved area within the parameter list 710 with the latest retrieved date and time 254. When the latest retrieved date and time 254 is newer, it is judged that the retrieved area is not updated at the previous retrieving operation and its subsequent. (Step 802) The microcontroller 4 examines the detection flag 255 if it is judged that the retrieved area is not updated at the Step 801. (Step 803) If the detection flag 255 is set in the condition (ON condition) detecting the retrieval character string, the microcontroller 4 sets in the host interface circuit 5 the command status 108 showing the detection of the retrieval character string so as to complete the processing operation of the FIND STRING command by the transferring operation to the host computer 1. When the retrieval management table 210 is retrieved with the parameter composed of the start address of the retrieved area 900 in, for example, FIG. 9, the size of the retrieved area 900 and the retrieval character string "ab" being considered one retrieval character string, the head table entry 232 is detected. The microcontroller 4 examines the detection flag 255, as the retrieved date and time T4 is newer than the registered date and time T1, so as to know the existence of the retrieval character string "ab" with the detection flag 255 being an ON condition. (Step 804) If the detection flag 255 is on a condition where the retrieval character string is not detected (OFF condition), the microcontroller 4 sets in the host interface circuit 5 the command status 108 showing that the retrieval character string has not been detected so as to complete the FIND STRING command processing operation by the transferring operation to the host computer. (Step 805) If it is judged that the retrieved area is updated at the Step 801, the microcontroller 4 examines the existence of the data within the retrieval data memory 15 recorded on the retrieved area.

The microcontroller 4 takes out the start address 712 of the retrieved area and the size 713 of the retrieved area within the parameter list 710 from the command register 18 so as to respectively compare the start address of the retrieved area accommodated in the area management register 19 and the size of the retrieved area and judges that the data of the retrieved area is stored in the retrieval data memory 15 if they are conformed. The address except for the range of the retrieved document recording area 201 is set in the area management register 19 when the power supply is put to work into the information retrieval apparatus 2, the microcontroller 4 sets the area management register 19 into a condition where the data does not exist within the retrieval data memory 15. (Step 806) When the microcontroller 4 judges the data recorded on the retrieved area are not stored in the retrieving memory 15 at the Step 805, it transmits the recording, reproducing control signal 104 including the start address 712 of the retrieved area and the size 713 of the retrieved area so as to start the reproducing operation of the retrieved data by the recording and reproducing circuit 10. The recording and reproducing circuit 10 detects the start address 712 of the retrieved area and demodulates the reproducing signal 102 so as to store the reproducing data produced with the execution of the error correction processing in the retrieval data memory 15 through the data bus 13. And the microcontroller 4 accommodates in the area management register 19 the start address 712 of the retrieved area and the size 713 of the retrieved area. (Step 807) The microcontroller 4 sets in the string detection circuit 6 the retrieval character string length 716 and the retrieving character sting 717 provided within the parameter list 710, then transmits the string detection control signal 111 so as to start the string detection circuit 6. The string detection circuit 6 reads out the data from the retrieval data memory 15 so as to execute the string detection operation. And the string detection circuit 6 completes the retrieving operation so as to transmit to the microcontroller 4 the string detection status 112 showing whether or not the retrieval character string has been detected. (Step 808) The microcontroller 4 makes the table entry 232. When the string detection status 112 shows the detection of the retrieval character string, the microcontroller 4 respectively sets the start address 712 of the retrieved area, the size 713 of the retrieved area, the retrieval character string 715 within the parameter list 710 in the start address 251 of the retrieved area of the table entry 232, the size 252 of the retrieved area and the retrieval character string 253, sets the present date and time 715 in the latest retrieved date and time 254, sets the ON condition in the detection flag 255, sets the detected matched address in the first address of matched data 256. Also, when the string detection status 112 shows the non-detection of the string character string, the microcontroller 4 respectively sets the start address 712 of the retrieved area in the parameter list 710, the size 713 of the retrieved area, the retrieval character string 715 in the start address 251 of the retrieved area of the table entry 232, the size 252 of the retrieved area and the retrieving character 253, sets the present date and time 715 in the latest retrieved date and time 254, sets the OFF condition in the detection flag 255. And the microcontroller 4 updates the table header 231, records together with the made table entry 232 on the retrieval management memory 16 and the retrieval result management area 200. When the retrieval management table 210 is retrieved with a parameter composed of the start address of the retrieved area 901, the size of the retrieved area 901, a retrieval character string "ab" being considered one retrieval character string in, for example, FIG. 9, a second table entry 232 is detected. As the recording date and time (updated date and time T5) of the retrieved area is newer than the latest retrieved date and time T4, the microcontroller 4 judges the retrieved area has been updated. As the microcontroller 4 respectively compares the start address of the retrieved area 901 and the size of the retrieved area 901 with the start address of the retrieved area accommodated in the area management register 19 and the size of the retrieved area only to know the difference, it reads out the data from the retrieved area 901 so as to accommodate them in the retrieval data memory 15. Also, the microcontroller 4 accommodates the start address and size of the retrieved area 901 in the area management register 19. And the string detection circuit 6 detects the retrieval character string "ab" in No. 30 of the data read out from the retrieval data memory. Then, the microcontroller 4 respectively sets the start address and the size of the retrieved area 901 in the start address 251 of the retrieved area and the size 252 of the retrieved area, sets the retrieval character string "ab" in the retrieval character string 253, sets T8 in the latest retrieved date and time 254, sets the ON condition in the detection flag 255, makes the table entry 232 of the retrieved area 901 with 30 being set in the first address of matched data 256.

If the table detection status 110 showing that the table entry 232 is not detected when the table detection circuit 6 has completed the retrieving operation in the Step 800, the microcontroller 4 executes the processing step (Step 805) and its subsequent operations. When the retrieval management table 210 is retrieved with a parameter composed of the start address of the retrieved area 903, the size of the retrieved area 903 and the retrieval character string "ab" in, for example, FIG. 9 being considered one retrieval character string, the corresponding table entry 232 is not detected. The microcontroller 4 respectively compares the start address of the retrieved area 903 and the size of the retrieved area 903 with the start address of the retrieved area accommodated in the area management register 19 and the size of the retrieved area only to know the difference, and reads out the data from the retrieved area 903 so as to accommodate them in the retrieval data memory 15. Also, the microcontroller 4 accommodates the start address of the retrieved area 903 and the size of the retrieved area 903 in the area management register 19. And the string detection circuit 6 detects the retrieval character string "ab" in No. 200 of the data read out from the retrieval data memory. Then, the microcontroller 4 respectively sets the start address of the retrieved area 903 and the size of the retrieved area 903 in the start address 251 and the size 252 of the retrieved area so as to set the retrieval character string "ab" in the retrieval character string 253, sets T8 in the latest retrieved date and time 254, sets the ON condition in the detection flag 255, makes the table entry 232 of the retrieved area 903 with 200 being set in the first address of matched data 256.

Also, the information retrieval apparatus 2 retrieves the retrieval management table 210 with the parameter composed of the start address of the retrieved area 903 of FIG. 9, the size of the retrieved area 903, the retrieval character string "cd" being considered one retrieval character string, the corresponding table entry 232 is not detected. Thus, the microcontroller 4 respectively compares the start address of the retrieved area 903 and the size of the retrieved area 903 with the start address of the retrieved area accommodated in the area management register 19 and the size of the retrieved area, and finds both are in match at this time, so as to start the string detection circuit 6. As the string detection circuit 6 does not detect the string character string "cd", the microcontroller 4 respectively sets the start address and the size of the retrieved area 903 in the start address 251 of the retrieved area and the size 252 of the retrieved area, sets the retrieval character string "cd" in the retrieving characters string 253, sets T8 in the latest retrieved date and time 254, makes the table entry 232 of the retrieved area 903 with the OFF condition being set in the detection flag 255.

As described hereinabove, the information retrieval apparatus 2 makes the retrieval management table 210 written as to whether or not the retrieval character string exists, records on the retrieval result management area 200 when the string detection operation 6 is executed on the data of the retrieved area, when the retrieved area not changed is retrieved again with retrieval character string retrieved in the past, the retrieval management table 210 has only to be referred to, so that the string detection operation is not required to be executed.

Also, as the table entry 232 to be conformed in the Step 800 is only one, the comparison with the unnecessary data can be omitted by the table detection operation.

Further, in the Step 805, the reading operation may be made unnecessary when the retrieved data recorded on the retrieved area exists already on the retrieval data memory 15 by the management of the retrieved data accommodated in the retrieval data memory 15 with the use of the area management register 19.

Figure 11A:
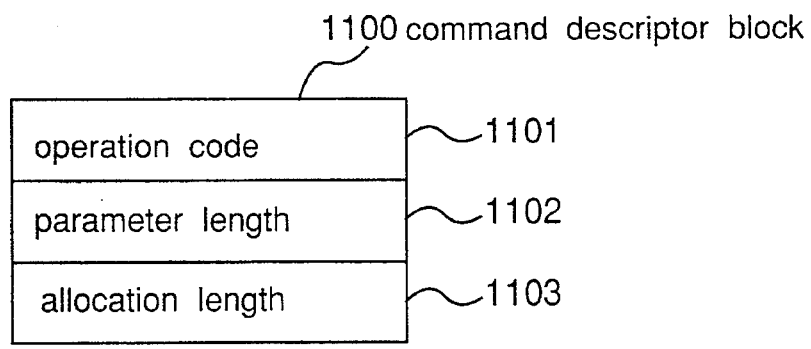
FIG. 11(a) is a diagram showing a structure of a command descriptor block of the GET POINTERS command.
Figure 11B:
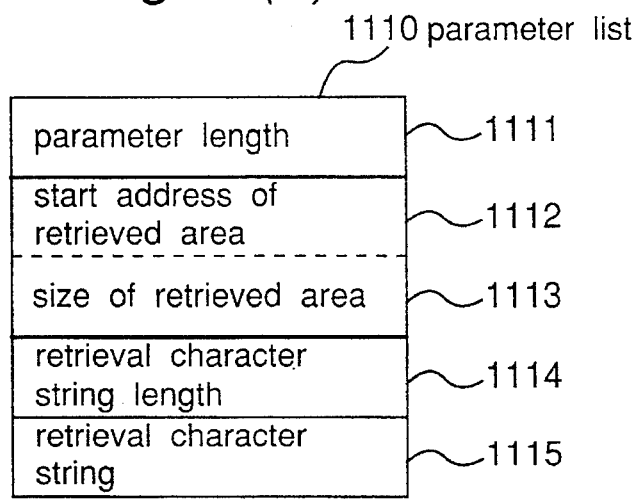
FIG. 11(b) is a diagram showing a structure of a parameter list of the GET POINTERS command.
Figure 11C:
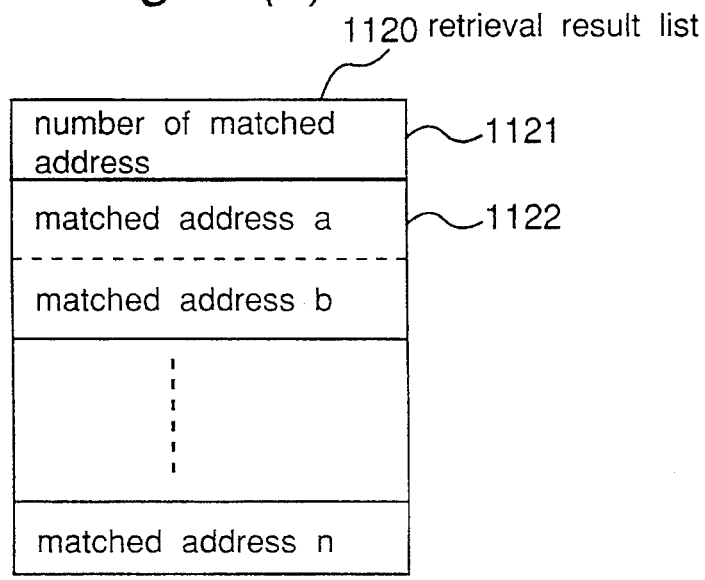
FIG. 11(c) is a diagram showing a structure of a retrieval result list after execution of the GET POINTERS command.

Then, FIGS. 11(a)–11(c) are a block diagram of a GET POINTERS command for detecting all the address informations of the retrieval character string to be included in the retrieved area specified by the host computer. FIG. 11 (a) is a block diagram of the command descriptor block of the GET POINTERS command. FIG. 11 (b) is a block diagram of a parameter list to be transferred from the host computer together with the command descriptor block. Also, FIG. 11 (c) is a block diagram of the retrieval result list to be transferred to the host computer after the execution of the GET POINTERS command.

The command descriptor block 1100 is composed of an operation code 1101 showing the GET POINTERS command, a parameter length 1102 which is the length of the parameter list, and the allocation length 1103 which is the maximum length of the retrieval result list to be received by the host computer.

The parameter list 1110 is composed of parameter length 1111, the start address 1112 of the retrieved area, the size 1113 of the retrieved area, the retrieval character string length 1114, and the retrieving character sting 1115. Also, the detected matched addresses 1122 and the number of the matched addresses 1121 which is the total thereof are set in the retrieval result list 1120.

Figure 12:
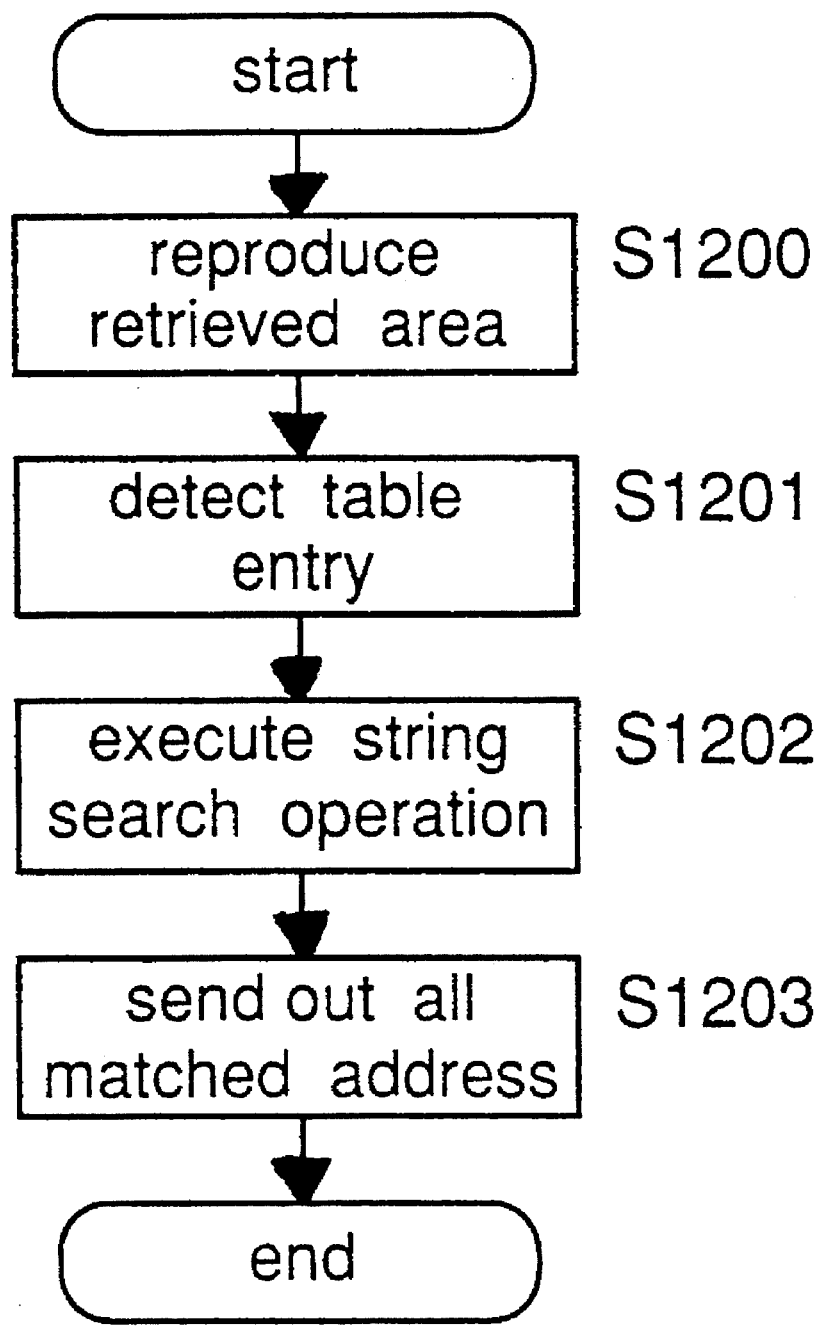
FIG. 12 is a flow chart for describing the operation of the GET POINTERS command.

Then, the operation of the GET POINTERS command will be described in accordance with the flow chart of FIG. 12. (Step 1200) The microcontroller 4 receives the device command 103 from the host interface circuit 5 and accommodates the parameter list 1110 in the command register 18. Then, the microcontroller 4 transmits a recording, reproducing control signal 104 including the start address 1112 of the retrieved area and the size 1113 of the retrieved area set in the parameter list 1110 so as to start the recording and reproducing circuit 10. The recording and reproducing circuit detects the start address 1112 of the retrieved area and demodulates the reproducing signal 102 and stores in the retrieval data memory 15 through the data bus the reproducing data produced by the execution of the error correction processing. (Step 1201) The microcontroller 4 sets in the table detection circuit 8 with the parameter composed of the start address 1112 of the retrieved area to be included in the parameter list 1110, the size 1113 of the retrieved area and the retrieval character string 1115 considered one retrieval character string. At the same time, the microcontroller 4 respectively sets the number of the entries 242, the entry length 243, the length of the retrieved field 411, and the length of the output field 412 in the table detection circuit 8 as the retrieving parameter described in FIG. 4. At this time, the retrieved field length is set so that the start address 1112 of the retrieved area, the size 1113 of the retrieved area, retrieval character string 1115 may be retrieved in match, the output field length is set so that the first address of matched data 256 may be outputted. After the setting operation of the various types of control parameters, the microcontroller 4 transmits the table detection control signal 109 so as to start the table detection circuit 8. Then, the table detection circuit 8 reads out the retrieval management table 210 from the retrieval management memory 16 so as to execute the table detection operation. The microcontroller 4 receives the table detection status 110 so as to obtain through the data bus 13 the first address of matched data 256 from the table detection circuit 8. (Step 1202) As the microcontroller 4 sets the retrieval character string length 1114, the retrieval character string 1115 to be included in the parameter list, a first address of matched data 256 obtained in the Step 1201 in the string search circuit 7, it transmits the string search control signal 113 so as to start the string search circuit 7. At this time, the string search circuit 7 reads out the data from the retrieval data memory 15 and detects, outputs all the matched addresses of the retrieval character string existing in the retrieved area by the execution of the string search operation from the first address of matched data 256 obtained in the Step 1201. The microcontroller 4 receives the character sting detail control status 114 to be transmitted each time the string search circuit 7 detects the match, receives the matched address from the string search circuit 7 through the data bus 13 so as to make the retrieval result list 1120 within the matched data memory 17 with the use of it. (Step 1203) The microcontroller 4 reads out the retrieval result list 1120 from the matched data memory 17 so as to transmit it to the host interface circuit 5, completes the processing operation of the GET POINTERS command by the transferring operation to the host computer 1.

The information retrieval apparatus 2 like this retrieves only the range where the retrieving operation is not effected in the string detection operation by the string search operation from the first address of matched data 256 within the table entry 232 and can detect all the addresses of the retrieval character string existing in the retrieved area.

Also, as the table entry 232 to be conformed in the Step 1200 is only one, the comparison with the unnecessary data can be omitted by the table detection operation.

In the Step 1202, although the description effected about the case where the retrieved area from the first address of matched data 256 within the table entry 232 is retrieved, it is needless to say that the retrieving operation may be effected from the start address of the retrieved area.

Further, the DELETE command to be executed, when the document file is deleted, so as to delete the unnecessary table entry 232 to be included in the retrieval management table 210 by the host computer 1 will be described.

Figure 13:
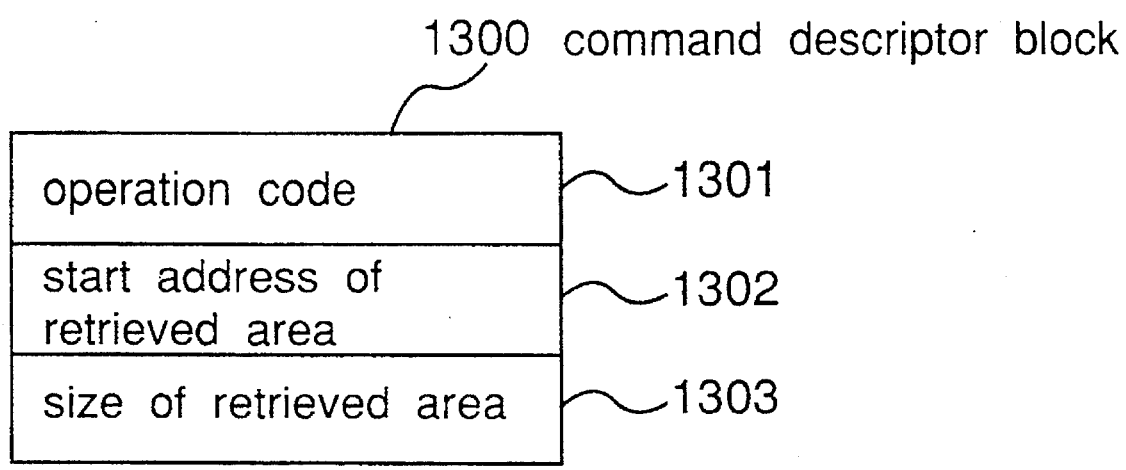
FIG. 13 is a diagram showing a structure of DELETE command.

FIG. 13 is a block diagram of the DELETE command. The command descriptor block 1300 of the DELETE command is composed of an operation code 1301 showing the DELETE command, the start address 1302 of the retrieved area to be deleted, and the size 1303 of the retrieved area.

The operation of the DELETE command will be described in accordance with the flow chart of FIG. 14. (Step1400) The microcontroller 4 receives the device command 103 from the host interface circuit 5 so as to set in the table search circuit 9 with the parameter composed of the start address 1302 of the retrieved area and the size 1303 of the retrieved area being considered one retrieval character string. At the same time, the microcontroller 4 respectively sets in the table search circuit 9 the number of the entries number 242, the entry length 243, the length of the retrieved field 411, and the length of the output field 412 as the retrieving parameter described in FIG. 4. At this time, the retrieved field length is set so that the start address 1302 of the retrieved area and the size 1303 of the retrieved area may be retrieved in matched, the output field length is set 0 so that nothing may output. After various types of control parameter were set, the microcontroller 4 transmits the table search control signal 115 so as to start the table search circuit 9. Then, the table search circuit 9 reads the retrieval management table 210 from the retrieval management memory 16 so as to execute the table search operation for detecting all the table entries to conform. The microcontroller 4 receives the table search status 116 to transmit each time the match is detected and receives from the table search circuit 9 the matched address through the data bus 13 so as to accommodate it in the matched data memory 17. (Step 1401) The microcontroller 4 takes out the matched addresses from the matched data memory 17 so as to delete the table entries 232 existing in the matched addresses within the retrieval management table 210 accommodated in the retrieval management memory 16, whereby all the table entries 232 with respect to the retrieved area specified with the device command are deleted. And the table header 231 is updated, the retrieval management table 210 within the retrieval management memory 16 is recorded in the retrieving result management area 200 so as to complete the processing of the DELETE command. When the retrieval management table 210 has been retrieved with the parameter composed of the start address of the retrieved area 902 and the size of the retrieved area 902 being considered one retrieving characters string in, for example, FIG. 9, a third table entry is detected. The microcontroller 4 obtains the matched address from the table search circuit 9 so that the table entry 232 of the retrieved area 902 existing in the address can be deleted.

For the higher speed of the retrieving processing after the deleting operation of the table entry 232 in the retrieval management table 210, the sorting processing operation is effected, as shown in the retrieving management table 2 by the microcontroller 4 with the start address 251 of the retrieved area, the size 252 of the retrieved area and the retrieval character string as key.

By the deletion of the table entry 232 corresponding to the deleted retrieved area, the information retrieval apparatus 2 in this manner can remove the comparison of the unnecessary table entry 232.

Also, when the retrieved area retrieved with a plurality of retrieval character strings is deleted, the table entry 232 corresponding to the retrieved area exists by plurality, all the table entry 232 corresponding to the retrieved areas can be detected by the table search operation.

According to the information retrieval apparatus of one embodiment of the present invention as described hereinabove, the retrieving results with the document file being retrieved, obtained are stored together with the retrieving conditions within the information recording medium and the retrieved data amount is deleted and can considerably reduce the retrieving time by the reuse when the document file is retrieved again with the same retrieving conditions.

Also, the information retrieval apparatus of the present invention is provided with a string detection circuit, a string search circuit, a table detection circuit, a table search circuit, and uses the string detection circuit when the existence of the retrieval character string is required to know, the string search circuit is used when the existence position of the retrieving characters string is required to know, the string search circuit is used when the existence position of the retrieval character string is required to know, the table detection circuit is used when the table entry to be detected within the table exists only one, the table search circuit is used when the table entry to be detected within the table exists by plurality so as to properly use the respective circuits so that unnecessary comparing operation can be removed.

In the embodiment described hereinabove, the string detection circuit 6, the string search circuit 7, the table detection circuit 8, the table search circuit 9 are built in the information retrieval apparatus connected with the host computer 1 for description thereof. If the retrieving circuits are provided within the host computer, the retrieving operation can be easily accomplished by the use of software.

Also, in the Step 807 in the operation description of the FIND STRING command of FIG. 8, whether or not the retrieval character string exists is checked by the use of the string detection circuit 6. But the presence, absence of the retrieval character string is examined by the use of the string search circuit 7 and also, all the matched addresses of the detected retrieval character string are set in the table entries 232, all the matched addresses within the table entry 232 from the table detection circuit 8 are obtained in the Step 1201 of the operation description of the GET POINTERS of FIG. 12, it is needless to say to easily realize that the processing of reproducing the retrieved area of the Step 1200 and the processing for executing the string search operation of the Step 1202.

Figure 14:
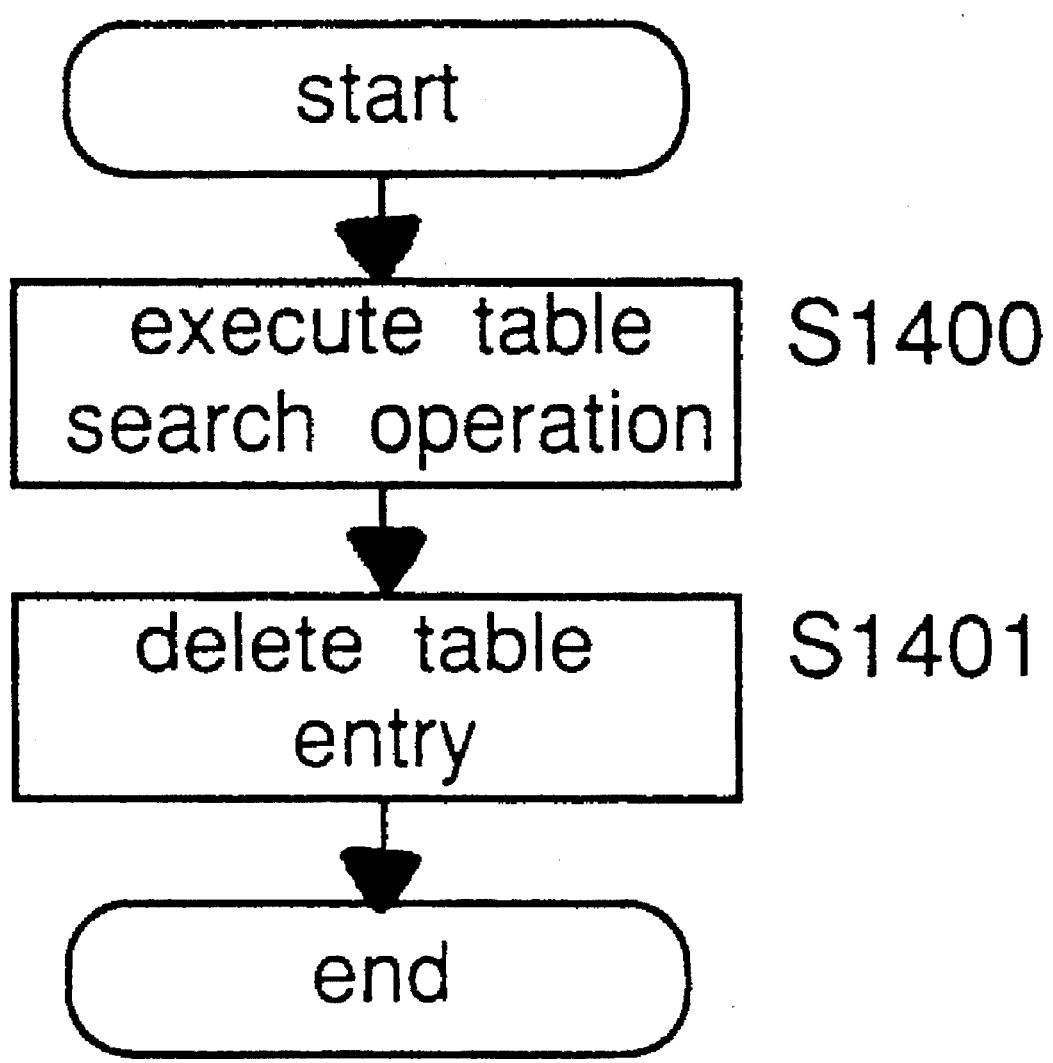
FIG. 14 is a flow chart for describing the operation of the DELETE command.

Further, in the operation description of the DELETE command of FIG. 14, the table entry 232 is deleted since all the matched addresses detected by the table search circuit 9 are accommodated in once matched data memory 17, and it can be easily realized to delete the table entry each time the matched address is detected.

What is claimed is:

1. An information retrieval apparatus, which is connected with a host computer and uses an information recording medium with many document files being recorded on it with the use of a file system where file recorded data date and time and file recording area are recorded as file management information, comprising:

a retrieval data memory for temporarily storing the retrieved data read out from the information recording medium, a string detection circuit for detecting the presence or absence of a retrieval character string by a matched comparison between the data within the retrieval data memory and a specific retrieval character string, a retrieval management table producing means for producing a retrieval management table composed of a plurality of table entries including document file recording area, retrieval character string, latest retrieved date and time, and retrieval results, a retrieval management memory for temporarily storing the retrieval management table, a recording and reproducing circuit for recording the contents of the retrieval management memory on the information recording medium and also, reproducing the data from the information recording medium so as to store on the retrieval data memory and the retrieval management memory, a table detection circuit for retrieving a table entry with the recording area of the specified document file and the Specified retrieval character string with respect to a retrieval management table stored in the retrieval management memory, and, a retrieval control means where, when a table entry with the recording area of the specified document file and the specified retrieval character string has been detected by the table detection circuit, the latest retrieved date and time recorded on the table entry are compared with the recorded date and time of the document file, the retrieval results stored on the retrieval management table are used, if the recorded date and time are older than the latest retrieved date and time, when the latest retrieved date and time are older than the recorded date and time or when a table entry with the recording area of the specified document file and the specified retrieval character string has not been detected by the table detection circuit, the document file is read out from the information recording medium, thereafter the retrieving operation of the document file is executed with the use of the string detection circuit, further the contents of the retrieval management table are updated in accordance with the retrieval results so as to record the updated contents on the information recording medium.

2. An information retrieval apparatus as defined in claim 1, where the retrieval control means uses the recorded date and time of the document file read out from the file management information by the host computer.

3. An information retrieval apparatus as defined in claim 1, where the retrieval control means uses as the latest retrieved date and time the present date and time to be transmitted by the host computer in update processing of the retrieval management table.

4. An information retrieval apparatus as defined in claim 1, further comprising a table search circuit for retrieving all the table entries having a recording area of the specified document file with respect to the retrieval management table stored in the retrieval management memory, a retrieval result table management means for retrieving, deleting with the use of the table search circuit from the retrieval management able all the table entries having the recording area of the document file deleted when the document file recorded on the information recording medium is deleted, and also for recording the contents of the updated retrieval management table in the information recording medium.

5. An information retrieval apparatus as defined in claim 1, further comprising a string search circuit for comparing a start position specified within the retrieval data memory the data within the retrieval data memory with the specific retrieval character string so as to transmit all detected positional information of the retrieval character string, a matched data memory for temporarily storing all the positional informations of the retrieval character string to be transmitted by the string search circuit, a position information retrieval means for setting the string search circuit as a start position a first position of matched data described on the retrieval result recorded on the table entry when the table entry having the recording area of the specified document file and the retrieval character sting is detected with the use of the table detection circuit, and for transferring to the host computer all the positional informations of the retrieval character string stored on the matched data memory after the retrieving operation of the data within the retrieval data memory with the use of the string search circuit.

* * * * *

UNITED STATES PATENT AND TRADEMARK OFFICE
CERTIFICATE OF CORRECTION

PATENT NO. : 5,457,794
DATED : October 10, 1995
INVENTOR(S) : Azumatani et al.

It is certified that error appears in the above-indentified patent and that said Letters Patent is hereby corrected as shown below:

Column 17, line 32, delete "data".

Column 17, line 58, delete "Specified" insert --specified--.

Signed and Sealed this

Thirtieth Day of April, 1996

Attest:

BRUCE LEHMAN

Attesting Officer    Commissioner of Patents and Trademarks